Jan. 9, 1951     W. B. BOICE     2,537,394
ABRASIVE WHEEL DRIVE
Filed Aug. 10, 1948
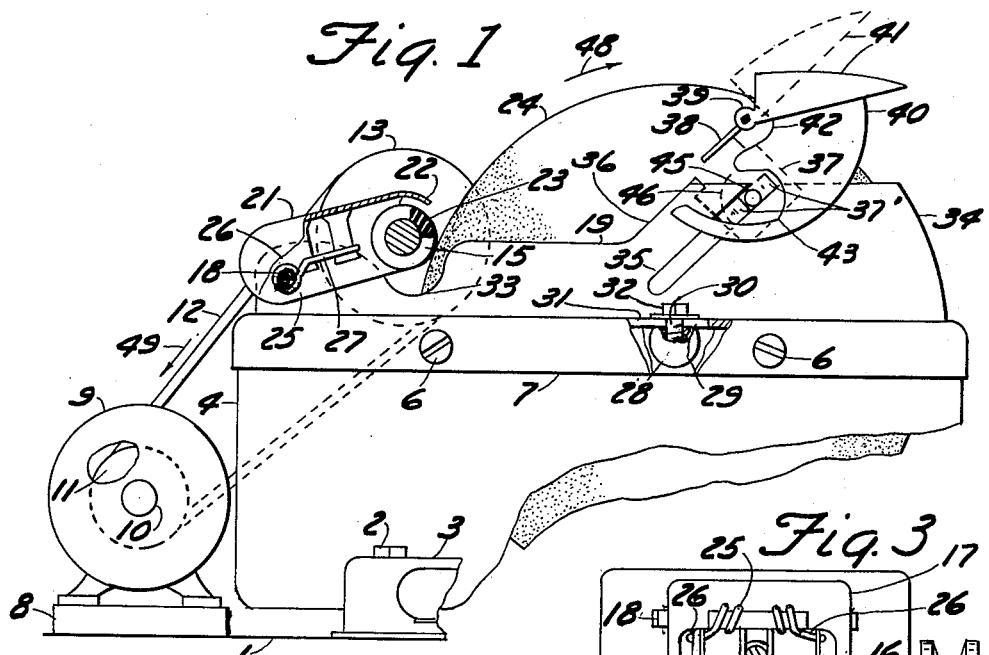
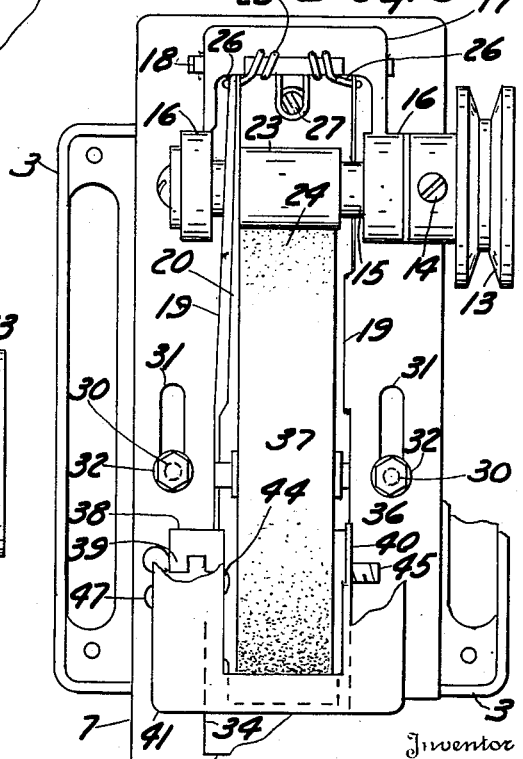
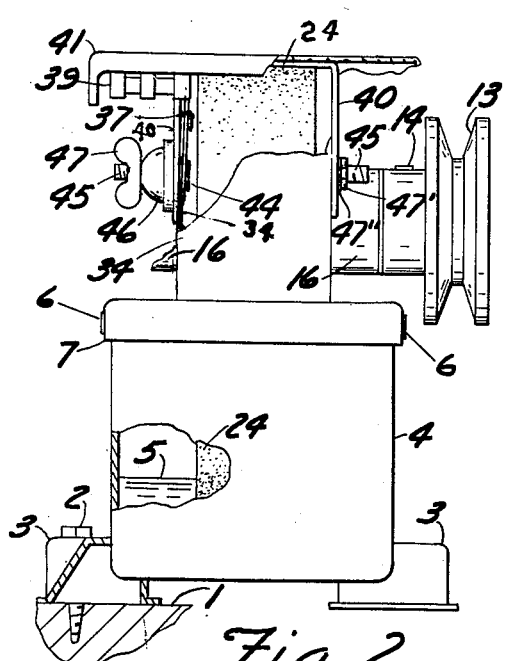
Inventor
William B. Boice
By Geo E Kirk
Attorney

UNITED STATES PATENT OFFICE 2,537,394

ABRASIVE WHEEL DRIVE

William B. Boice, Toledo, Ohio, assignor to Boice-Crane Company, Toledo, Ohio, a corporation of Ohio Application August 10, 1948, Serial No. 43,393

2 Claims. (Cl. 51—134.5)

This invention relates to approximating uniformity in use of a variable diameter working tool, having to do not only with rotative speed but work treatment.

This invention has utility when incorporated in a wet grinder, wherein there is a peripheral drive for the abrasive element or wheel, and diameter reduction compensation controls for relocating the element and the work to be acted upon.

Referring to the drawings:

Fig. 1 is a side elevation of an embodiment of the invention in a bench type of wet grinder, parts being broken away;

Fig. 2 is an end elevation from the right of Fig. 1, with some portions removed; and Fig. 3 is a partial plan view of the unit of Fig. 1.

Upon a bench 1 screws 2 may anchor sheet metal feet or brackets 3 as weld-assembled with a receptacle or vessel 4 adapted to retain a cutting promoting substance or water 5. Set screws 6 provide for mounting a removable lid or cover 7 on the open top of the vessel 4.

A base 8 on the bench 1 provides support for a prime mover or electric motor 9 having on its shaft 10 a pulley 11 for a V-type belt 12 to a driven pulley 13 fixed by a set screw 14 with a shaft 15. The shaft 15 has bearings 16 in a U-bracket 17 swingable on a bearing pin 18 mounted by parallel cheek portions or flanges 19 rising from the lid 7 about an opening 20. A cover 21 spanning between the pin 18 and the shaft 15 forms a partial shield 22 over a friction drive rubber faced roller 23. The roller 23 is yieldably held to peripherally engage abrasive disk or grinding element 24 upwardly protruding from the opening 20 between the flanges 19. A torsion spring 25 having its ends 26 engage the flanges 19 and with spring wraps about the pin 18 has a medial loop 27 engaging the underside of the cover 21, thereby urging the roller 23 against the grinder 24.

The grinder wheel 24 is rotatably mounted on a shaft 28 with flattened end portions 29 engaged by externally threaded stems 30 thru slots 31 in the lid 7 adjacent the flanges 19. The slots 31 are parallel to each other and laterally to a radius to the shaft 15. Adjusted proximity for efficient contact between the driving friction roller 23 and the driven disk 24 is determined and caps 32 on the stems 30 clamp lock the disk 24 against shifting therefrom during operation.

Inasmuch as the disk 24 is of approximately uniform abrasive body thruout and the use gradually wears off small particles to reduce its effective or working diameter, the resetting permitted thru the slots 31 may be undertaken in compensation for wearing down the wheel 24. Inasmuch as the drive roller 23 has peripheral contact, this means that, even tho the diameter of the work engaged wheel 24 may be reduced, its lineal peripheral speed will be maintained. Notches 33 in the flanges 19 provide clearance for the shaft 15 to swing downward in maintaining its frictional driving contact with the disk 24.

Remote from the notches 33, the flanges 19 have a higher shield portion 34 about the wheel 24, with downwardly and inwardly or toward the notches 33, a pair of slots 35 parallel to inclined top edge portions 36 extending to the flange portions 19. For each slot 35 there is an angle plate 37 down flange inside the slot 35 with an outwing 38 therefrom to ride clear of the edge 36 and provide a bearing 39 for a relatively rockable work rest or support upon which objects to be dressed or treated may be steadied in being held and directed by the operator for the work to be in engagement with the disk 24. A pair of depending arc flanges 40 from the inner sides of the legs of the U-shaped rest 41, have clearance 42 as to the bearing 39 and arc slots 43 spaced by the shield 34 from the plate 37. Offsets or lugs 37' from the plate 37 ride in the slot 35 and hold the plate 37 from tilting.

From a head 44 on a pin 45 in the opening 20 side of the plate 37, the pin 45 extends thru and is held fixed with the plate 37 and the slot 35 fixed with the vessel lid 7 and on thru the arc slot 43 fixed with the tool rest 41. A clamp washer 46 on the pin 45 may be set by a wing nut 47 having threaded engagement with the pin 45. There is thus provided here a full range for tool rest rock adjustment. Slacking of a nut 47' from a clamp washer 47'' loosens up to permit movement of the pin 45 inward along the slot 35 to have take-up as the disk 24 has its diameter become less from wear. Furthermore, outward adjustment may be had, say upon insertion of a new wheel 24, or to take care of special rest positions for a desired type of work support. The adjustments last described have to do with merely sliding along the slot 35, without any relative movement between the flanges 40 and the pins 45. In order to vary the top plane or side of the rest 41, as to the approach thereof to the peripheral face of the disk 24, when the wing nuts 47 at each side are loosened, the free end edge of the rest 41 may be pushed downward, or lifted upward to gain the desired pitch or slant. In this operation, the slots 43 of the flanges 40 move relatively to the pins 45 and the washers 57''. Upon locking of the work rest 41, the wingnuts 47 pull the heads 44 to cause the plates 37 to frictionally grip the inner sides of the shield 34 at the slots 35, while simultaneously the clamp washers 46 grip the flanges 40 in the vicinity of the slots 43 against the outer faces or sides of the shield 34.

Arrow 48 indicates the direction of rotation of the abrasive element 24, herein shown as clockwise (Fig. 1). This means that the friction driving roller 23 has a counterclockwise direction of rotation. The firm driving relation of the roller 23 on the element 24 seems to reduce the liquid to a film spread condition and minimizes tendency to have such thrown toward the operator. The down direction reach indicated by arrow 49 for the belt 12 in conjunction with the spring 25 establishes a practical holding-in or driving relation for the roller 23 with the element 24.

What is claimed and it is desired to secure by Letters Patent is:

1. In a wet grinding apparatus, a tank adapted to contain liquid, a rotary grinding wheel, means for so mounting the wheel that a portion thereof extends into the tank and a portion projects above the tank, a work holder mounted adjacent the periphery of the grinding wheel, and friction drive means adapted to rotate said grinding wheel to cause a peripheral portion thereof to pass through the liquid to wet the same and to advance the wetted surface toward the work holder, said driving means including a friction roller adapted to engage the wetted surface of said wheel as it rises from the liquid in the tank in advance of the work holder, whereby the roller serves the dual function of actuating the grinding wheel and of removing excess moisture from the rising surface of the wheel before it reaches the work holder.

2. A grinding apparatus as set forth in claim 1, wherein the friction roller is carried by a hingedly mounted bracket at a position remote from the bracket hinge, whereby the frictional contact between the roller and grinding wheel is aided by gravity.

WILLIAM B. BOICE.

REFERENCES CITED

The following references are of record in the file of this patent:

UNITED STATES PATENTS

| Number | Name | Date |
| --- | --- | --- |
| 136,939 | Richardson | Mar. 18, 1873 |
| 367,331 | Barnes | July 26, 1887 |
| 498,623 | Clock | May 30, 1893 |
| 504,329 | Clapp | Sept. 5, 1893 |
| 516,353 | King | Mar. 13, 1894 |
| 538,331 | Hyde | Apr. 30, 1895 |
| 618,293 | Ridley | Jan. 24, 1899 |
| 656,171 | Clapp | Aug. 21, 1900 |
| 763,635 | Rexroth | June 28, 1904 |
| 1,185,182 | Davis | May 30, 1916 |
| 1,824,000 | Walter | Sept. 22, 1931 |
| 2,092,714 | Flygare | Sept. 7, 1937 |
| 2,228,386 | Burns | Jan. 14, 1941 |
| 2,444,598 | Eyles | July 6, 1948 |

FOREIGN PATENTS

| Number | Country | Date |
| --- | --- | --- |
| 476,655 | Germany | May 2, 1929 |